United States Patent [19]

Onogi et al.

[11] Patent Number: 4,567,556
[45] Date of Patent: Jan. 28, 1986

[54] SEQUENCE CONTROLLING APPARATUS

[75] Inventors: Toshiro Onogi; Kenichi Yoda; Masahiko Kitamura, all of Mie, Japan

[73] Assignee: Matsushita Electric Works, Ltd., Osaka, Japan

[21] Appl. No.: 354,369

[22] Filed: Mar. 3, 1982

[30] Foreign Application Priority Data

Mar. 17, 1981 [JP] Japan .................................. 56-39070

[51] Int. Cl.$^4$ ......................... G06F 13/00; H05K 5/00
[52] U.S. Cl. ............................ 364/140; 340/825.79; 340/825.83; 357/72; 357/74
[58] Field of Search ... 364/200 MS File, 900 MS File, 364/140, 141, 708, 709, 706, 707, 400; 365/215, 52, 94, 218, 104, 226–228; 361/392, 393, 394, 395; 371/66; 340/825.79, 825.83, 825.84, 825.89; 318/DIG. 1; 307/41, 139, 141, 141.4, 141.8; 357/72, 73, 74

[56] References Cited

U.S. PATENT DOCUMENTS

| | | | |
|---|---|---|---|
| 3,321,747 | 5/1967 | Adamson | 371/66 X |
| 3,593,289 | 7/1971 | Weilheim | 340/825.83 |
| 3,684,358 | 8/1972 | Boudouris et al. | 340/825.83 X |
| 3,813,652 | 5/1974 | Elmer et al. | 364/200 |
| 3,875,564 | 4/1975 | Thuruokas et al. | 364/140 X |
| 3,924,246 | 12/1975 | Scherer | 365/94 |
| 3,974,484 | 8/1976 | Struger et al. | 364/900 |
| 4,025,902 | 5/1977 | Nakao et al. | 364/900 |
| 4,030,080 | 6/1977 | Burkett et al. | 364/900 |
| 4,069,427 | 1/1978 | Masuda | 365/104 X |
| 4,075,707 | 2/1978 | Wilmer | 364/900 |
| 4,084,237 | 4/1978 | Beachem et al. | 364/400 |
| 4,093,942 | 6/1978 | Suzuki et al. | 365/104 |
| 4,153,937 | 5/1979 | Poland | 364/706 |
| 4,169,291 | 9/1979 | Rossler | 365/104 X |
| 4,180,744 | 12/1979 | Helwig, Jr. | 340/825.83 X |
| 4,183,093 | 1/1980 | Kawagoe | 365/104 |
| 4,200,914 | 4/1980 | Kintner | 364/900 |
| 4,206,507 | 6/1980 | Payling | 340/825.83 |
| 4,215,398 | 7/1980 | Burkett et al. | 364/141 X |
| 4,216,522 | 8/1980 | Slagel et al. | 361/392 |
| 4,254,460 | 3/1981 | Achter et al. | 307/141 X |
| 4,295,181 | 10/1981 | Chang et al. | 361/394 X |
| 4,388,010 | 6/1983 | Mott et al. | 361/395 X |
| 4,399,524 | 8/1983 | Muguruma et al. | 365/228 X |
| 4,410,991 | 10/1983 | Lenart | 371/66 |

OTHER PUBLICATIONS

IBM Technical Disclosure Bulletin; *C-4 Package for Programmable Read-Only-Memory;* S. B. Greenspan; vol. 23, No. 3, Aug. '80.

Primary Examiner—Jerry Smith
Assistant Examiner—Allen MacDonald
Attorney, Agent, or Firm—Birch, Stewart, Kolasch & Birch

[57] ABSTRACT

A sequence control apparatus includes a control unit and a memory unit detachably mounted to the control unit. The memory unit includes a memory device connected to an input circuit and an output circuit of the control unit via a pin connector. The memory device itself conducts logical operations in response to the input signals applied to the input circuit of the control unit.

8 Claims, 17 Drawing Figures

SEQUENCE CONTROLLING APPARATUS

BACKGROUND OF THE INVENTION

1. Field of the Invention

The present invention relates to a sequence controlling apparatus and more particularly to a sequence controlling apparatus for providing sequence outputs to a load apparatus, such as a solenoid and a motor, by making a logical operation of input signals from a sensor and the like.

2. Description of the Prior Art

As an old sequence controlling apparatus, a so-called relay sequencer has been known. In the relay sequencer, the wiring must be changed in order to change a program and thus it is difficult to obtain a general purpose sequencer.

Then, large-sized sequence controlling apparatus were utilized and used a large-sized computer to control a plant and the like. Although this type of sequence controlling apparatus using a large-sized computer overcomes a general purpose problem such as in an old sequencer, it is not suitable for a small-sized sequence controlling apparatus.

With advancement of a recent semiconductor technology, it is proposed that a small-sized central processing unit such as a microprocessor of microcomputer having a relatively complicated operation function may be utilized in a sequence controlling apparatus.

However, a sequence controlling apparatus using a microcomputer (central processing unit) is complex in the circuit structure and expensive and in addition to these, there is a problem of poor electrical noise-proofing. Furthermore, in case where a timer function is provided using a sequence controlling apparatus, the state of use of such timer function can not be seen from the outside and it is no easy to change the timer time, because in an apparatus using a central processing unit, the timer function is achieved by a program.

SUMMARY OF THE INVENTION

A sequence controlling apparatus in accordance with the present invention includes a control unit comprising input terminals coupled to input signals, an input circuit connected to the input terminals, an output circuit, output terminals connected to the output circuit for withdrawing output signals, and connectors connected to the output circuit and the input circuit; and a memory unit comprising a connector disconnectably connected to said connector of said control unit and a memory device connected to the input circuit and output circuit by said connectors for making a logical operation of input signals to provide sequence signals to the output circuit.

In accordance with the present invention, a small-sized, inexpensive and substantially noise-proof sequence controlling apparatus can be obtained since a logical operation function can be performed by a memory device, without using a microcomputer (central processing unit).

A sequence controlling apparatus in accordance with a preferred embodiment of the present invention is characterized in that an electronic block comprising an input circuit, an output circuit and a power circuit is housed in a generally rectangular body; input terminals and output terminals are provided in both sides of the body opposed to each other; and a recess surrounded by a surrounding wall is provided in one end portion of the body where both terminals are not disposed. A control unit is disposed in said recess wherein a male connector is connected to said output circuit and input circuit. A memory unit is housed in a case which comprises a connection of a female connector to the input circuit and the output circuit through a connector of said control unit, and an erasable programmable read only memory. A hole is made in the case to correspond to a window for use in erasing of the erasable programmable read only memory; the window for erasing is closed toward the recess with said case being connected to the control unit and being housed within the surrounding wall; and a gap for use in removing the memory unit is provided between a flange provided in the case and the body.

In accordance with the embodiment, since a memory unit including a case housing an erasable programmable read only memory and a female connector is connected to the input circuit, the output circuit, and the input and output terminals of the control unit by the connector in the surrounding wall of the body of the control unit, a small-sized and inexpensive sequence controlling apparatus the operation ability of which is good, can be obtained, reprogramming is possible with the memory unit being housed, and the memory device can be fully protected against an electrostatic breakdown.

A memory unit of a sequence controlling apparatus in accordance with another embodiment of the present invention is characterized in that the connection of an erasable programmable read only memory with a female connector is mounted on a printed board and is housed in a case and a portion of said erasable programmable read only memory to be erased and the connector are made to correspond to windows provided in the case, respectively.

In accordance with the embodiment, electrostatic breakdown can be prevented and erasing and rewriting of memory can be easily achieved with the memory being housed in the case, since the erasable programmable read only memory and the female connector are housed in the case so that the windows of the case correspond to the portion to be erased and the connector.

A control unit in accordance with a further embodiment of the present invention is of a control unit in a sequence controlling apparatus wherein an address side of a memory such as a read only memory is connected to an input circuit, a data side thereof is connected to an output circuit and a sequence control is made based on a program in the memory and wherein the $\overline{OE}$ terminal of the memory is connected to the output of a voltage detecting circuit which makes low a detecting signal of a voltage detecting device for detecting a predetermined supply voltage.

In accordance with the embodiment, a sequence controlling apparatus will not provide a sequence output other than predetermined sequence outputs in an undefined area, since the sequence controlling apparatus is adapted such that the $\overline{OE}$ terminal is rendered to be a high level at the time of turning the power supply on. Thus, an erroneous sequence output is not output, as the $\overline{OE}$ terminal is rendered to be a low level when a predetermined voltage is reached and detected by a voltage detecting circuit, so that the output circuit of the memory is set to an operating state.

An output apparatus of a sequence controlling apparatus in accordance with a still further embodiment of the present invention has an input circuit and an output circuit connected to an address side and a data side of the erasable programmable read only memory to act as a memory. A sequence is controlled based on a program stored in the memory, and is characterized in that the data output of a low level from the memory is set to be outputted from the output circuit, the data side of the memory is connected to the power supply through a resistor and an output relay is driven through a non-inverting circuit comprising at least two stages of transistors.

In accordance with this embodiment, since the terminals in the data output side are set to a low level so that the output relay is driven through a non-inverting circuit, erroneous ouput is not withdrawn even if no data is written into the memory and the memory is not inserted, and thus a load operated by the sequence operations can not be interrupted, and accordingly, the reliability of a sequence controlling apparatus is increased.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
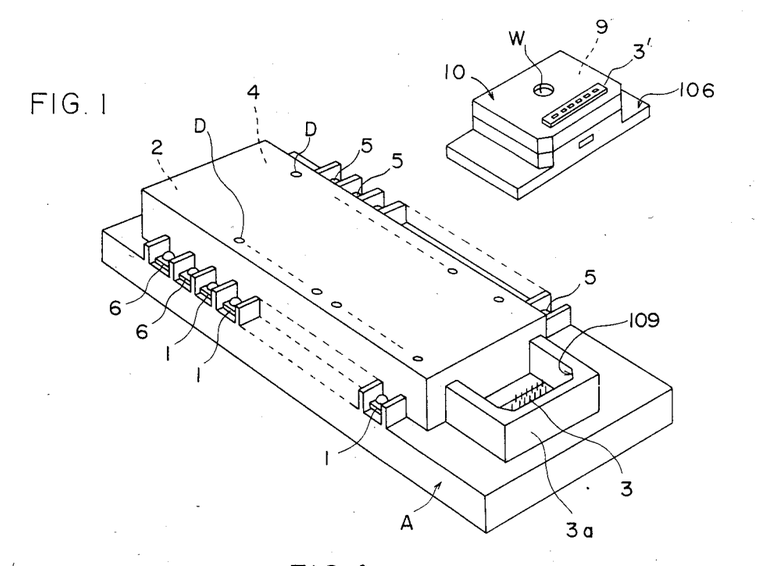
FIG. 1 is a perspective view showing an embodiment of the present invention.
Figure 1A:
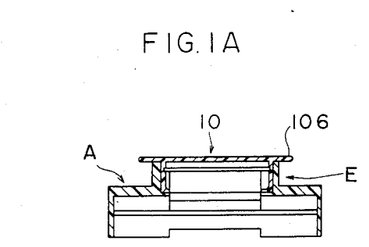
FIG. 1A is a cross-sectional view showing the state wherein a memory unit is mounted in a control unit.

The external appearance of a sequence controlling apparatus in accordance with an embodiment of the present invention is shown in FIG. 1. Input terminals 1 and output terminals 5 are aligned in both ends of both longitudinal sides of a body A made of an insulating material. An input circuit and an output circuit 2 and 4 (described subsequently) are housed in a middle portion of the body A, and are covered by a cover. Light-emitting diodes D indicating the presence or absence of input signals and output signals are provided in a manner such that they are exposed through windows in the cover. A connector 3 (male side) is disposed in a surrounding wall 3a which is integrally provided in the body. The surrounding wall 3a prevents the connector 3 from easily being contacted by an external object and thus a memory device (described subsequently) is protected against an electrostatic breakdown. Projecting connecting pins of the connector 3 are also protected by the surrounding wall 3a and thus deformation of the pins is prevented. On the other hand, a memory unit 10 contains an erasable programmable read only memory which is housed within a container with a flange made of an insulating material. The memory unit 10 is provided with an ultraviolet ray applying window W for use in erasing, so that the program in the erasable programmable read only memory can be erased while the erasable programmable read only memory is housed in the container. A connector 3' (female side) is disposed in the bottom of the memory unit 10. Since the connector 3' is a female connector, it is difficult to contact with an external object and thus the erasable programmable read only memory is protected from electrostatic breakdown. The memory unit 10 is guided by the surrounding wall 3a so that the unit 10 is connected to the connector 3 by the connector 3'. At that time, a gap E is provided between a flange 106 of the memory unit 10 and the body A, as shown in FIG. 1A, so that the memory unit is easily removed by a finger or by using a tool (not shown).

Figure 2:
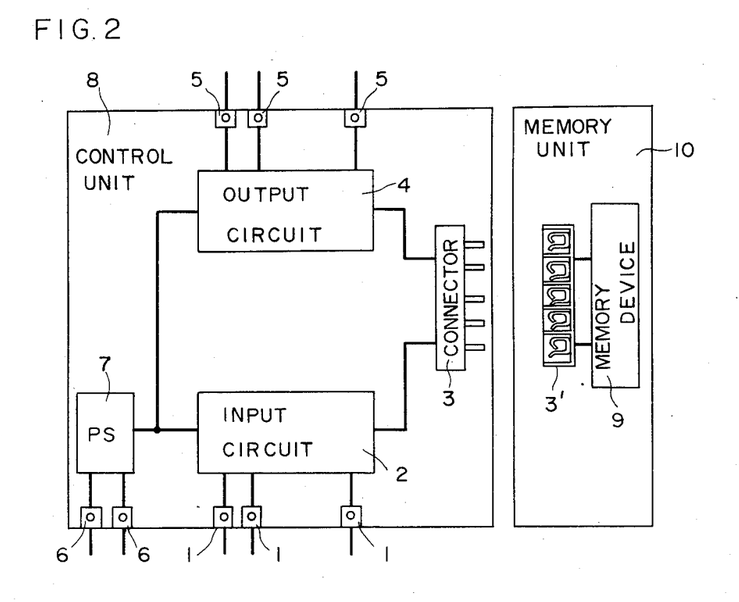
FIG. 2 is a block diagram showing an embodiment of the present invention.
Figure 3:
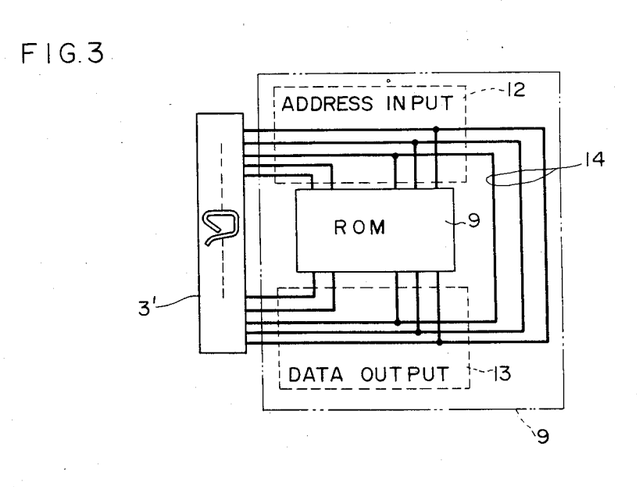
FIG. 3 is a block diagram showing in detail a memory unit.

With reference to FIGS. 2 and 3, the embodiment will be described.

The control unit 8 is provided with a plurality of input terminals 1 for connecting input signals of sensors (not shown), such as photoelectric switches, limit switches and contactless switches, start and stop signals, common lines and the like. These input terminals 1 are connected to an input circuit 2 (subsequently described in detail) having means for insulating its interior from the exterior by means of a photocoupler or the like. Input signals are coupled to the male connector 3 through the input circuit 2.

Sequence signals fed from said memory unit 10 are coupled to an output circuit 4 (subsequently described in detail) through the connector 3. The output terminals 5 have outputs from a relay driving circuit and a relay provided in the output circuit 4 connected thereto, the output terminals 5 being connected to a load apparatus (not shown), such as a solenoid or a pulse motor to be sequence controlled.

Power supply terminals 6 are connected to a power circuit 7 connected thereto, which supplies a power supply to the input circuit and the output circuit 2 and 4, and, as necessary, supplies a power source to a memory unit as described subsequently through the connectors 3 and 3'.

The control unit 8 comprises the input terminals 1, the input circuit 2, the connector 3, the output circuit 4, the output terminals 5, the power supply terminals 6 and the power circuit 7.

The memory unit 10 includes a female connector 3' and a memory device 9 connected to the input circuit and output circuit 2 and 4 through the connector 3' and included in the above described control unit 8. As described in the foregoing, since the connector 3' is a female connector, a blade receiving spring for receiving the connecting pins of the connector 3 is housed in an insulating container, so that undesired electrostatic breakdown of the memory device 9 is effectively prevented.

As shown in FIG. 3, a read only memory 9 is used as an example of the memory device. An address input side 12 and a data output side 13 are short circuited on a printed board for the read only memory 9 by means of a short circuit 14, so that a self holding circuit is structured and complicated logical operations can be made.

The same memory unit 10 can be utilized to make a separate sequence control by adopting as the memory device, i.e., a read only memory 9, an erasable programmable read only memory (for example, model No. 2716 manufactured and sold by Intel Inc. and the like). More particularly, the program once stored in the erasable programmable read only memory 11 can be erased by ultraviolet ray irradiation and thus another program can be stored in the erasable programmable read only memory 11 using a read only memory writer (subsequently described).

Thus, by providing the memory device 9 with a complicated logical operation function, the memory unit 10 can make the same logical operation functions as a conventional sequence controlling apparatus using a conventional central processing unit except for a timer function and count function.

Instead of the read only memory, a random access memory (having a backup battery) can be used.

Any usual read only memory other than the erasable programmable read only memory can be used. In this case, another sequence control can be readily achieved by replacing the memory unit 10 with a new unit storing another program by means of the connectors 3 and 3'.

The operation of the above described control unit 8 and memory unit 10 will be summarized in the following. A start signal is entered to a start terminal in the input terminals 1 for receiving the start signal so that a sequence operation is initiated in accordance with a program stored in the memory unit 10. Thereafter, output signals are withdrawn in a program sequence based on input signals from sensors for advancing sequence operations and a series of sequence operations are made until the program finishes.

If and when it is necessary to stop a sequence during a sequence operation, it is possible to stop the sequence operation by inputting a stop signal into a stop terminal in the input terminals 1.

If necessary, a desired time can be fed back into the input side by connecting timer means between the output terminals 5 and the input terminals 1 of the control unit 8 and manipulating the time adjusting portion of the timer means.

A known CR timer, a digital timer being capable of displaying lapse of time, and the like may be used. In addition, sequence signals can be outputted based on the number of counts and a count completion signal may be generated by connecting a counter in the same manner as the timer.

Thus, a sequence controlling apparatus having the same timer function and/or counter function as the conventional one can be obtained by connecting a desired timer means or counting means between the terminals of the input circuit and output circuit 2 and 4 of the control unit 8. It is easy to adjust the timer means or counting means and is also easy to display the state of the sequence operation by means of display means provided in each means, while the sequence operation is the same as the conventional one using a central processing unit. And thus, present sequence controlling apparatus is simple in structure and is inexpensive since the central processing unit need not be used.

As described in the foregoing, in accordance with the present embodiment of the sequence controlling apparatus, a memory unit is structured with connectors so as to make a logical operation by means of a memory device and a control unit 8 is structured by input terminals, an input circuit, output terminals, an output circuit, a power supply terminal, a power circuit and a connector 3. Therefore, since the memory unit 10 is disconnectably connected by the connectors 3 and 3', an inexpensive sequence controlling apparatus can be provided without using a microcomputer (central processing unit) and thus the substantially noise-proof performance may be enhanced since the microcomputer is not used.

Meanwhile, as shown in FIG. 1, the body A is made generally rectangular, in both sides of the body, the input terminals 1 and output terminals 5 are aligned opposed to each other, and a recess is formed by the surrounding wall 3a in one end in the longitudinal direction of the body A where the input terminals 1 and output terminals 5 are not disposed, the connector 3 being housed in the recess and the memory unit 10 being mounted in the recess. Accordingly, the memory device in the memory unit 10 can be provided physically removed from the input circuit and the output circuit to the extent possible so that the memory device is not affected by the input circuit and the output circuit. In addition, due to the location of each component, a small and compact sequence controlling apparatus can be obtained which is easy to operate.

Figure 4:
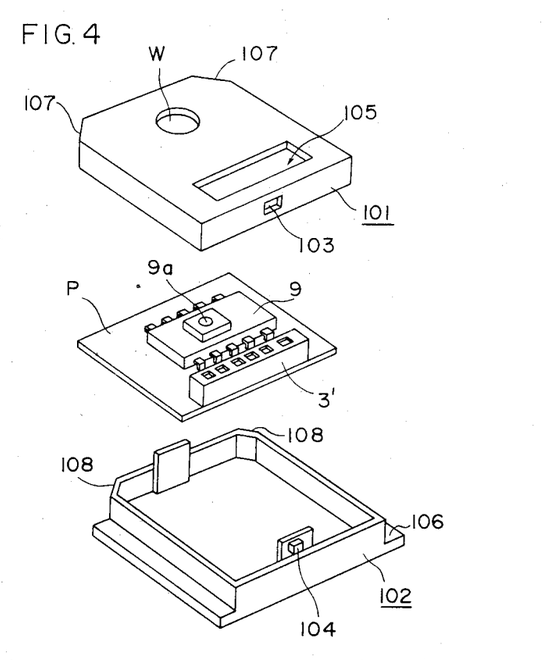
FIG. 4 is an exploded perspective view showing a memory unit.

FIG. 4 is an exploded perspective view showing an example of the memory unit. A printed board P for mounting an erasable programmable read only memory 9 thereto is housed in halves 101 and 102 of a case and both half cases 101 and 102 are engaged by a hole 103 and a projected piece 104. Windows W and 105 correspond to portion 9a to be erased of the memory device and the connector 3', respectively. The window W may be covered by a lid made of a transparent material of ultraviolet ray transmission type so as to prevent any dust from entering into the case. The connector 3' may be projected or may not be projected from the window 105, provided that the connecting pins in the connector 3 can be connected to the connector 3'. The case is provided with a flange 106 so that handling in inserting or removing the connector 3' can be easily made. The chamfered edges 107 and 108 indicate an inserting direction for the connector are provided in the cases 101 and 102 and the corresponding chamfered portions 109 are also provided in the surrounding wall 3a (FIG. 1) of the body A.

The memory unit 10 is guided by the surrounding wall 3a (FIG. 1) so that connectors are connected without deforming the connecting pins.

Thus, the contents in the memory are erased by irradiation with ultraviolet rays and a new program can be written into the memory through the connector 3' by means of a read only memory writer (described subsequently).

As described in the foregoing, in accordance with the present embodiment, electrostatic breakdown can be prevented and erasing and rewriting of memory can be easily achieved with the memory being housed in the case, since the erasable programmable read only memory and the female connector are housed in the divided case so that the windows of the case correspond to the portion to be erased and the female connector, respectively.

Figure 5:
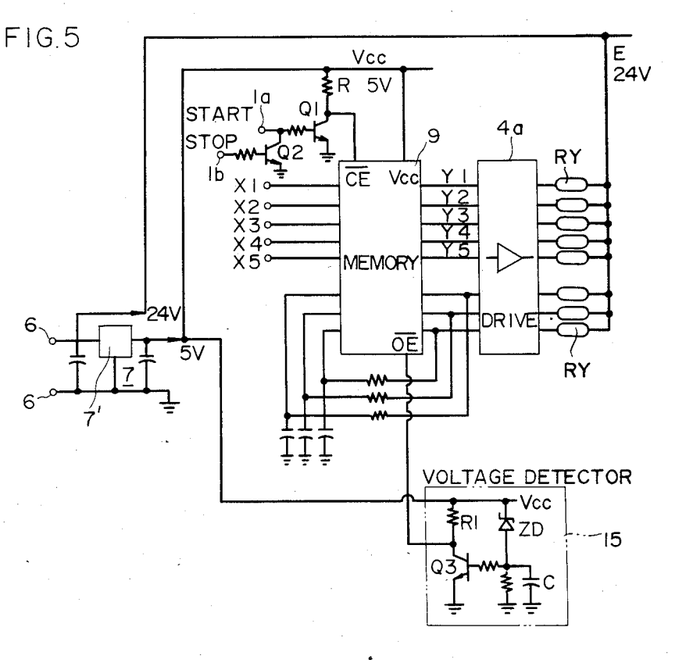
FIG. 5 is a circuit diagram showing an embodiment of the present invention.
Figure 6:
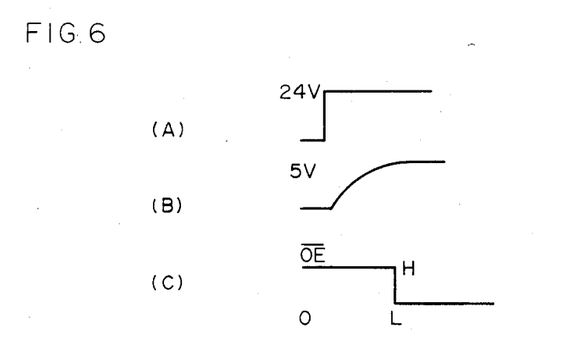
FIG. 6 is a timing charge for explaining an operation of the FIG. 5 embodiment.

FIG. 5 is a circuit diagram showing an embodiment of the present invention. FIG. 6 is a timing chart for explaining an operation of the FIG. 5 embodiment.

A memory 9 may be a read only memory (ROM), a random access memory (RAM), a programmable read only memory (P-ROM) or an erasable programmable read only memory (E-P-ROM). The terminals X1, X2, . . . in the address side of the memory 9 are coupled to inputs from a sensor (not shown) maintaining a sequence operation and the terminals Y1, Y2, . . . in the data side of the memory 9 are connected to actuate output relays RY through a driver circuit 4a comprising switching transistors and the like. The power supply of 24 V is applied to the output relays RY through terminals 6. A power circuit 7 includes a three-terminal regulator 7' through which a power supply of 5 V is applied to the memory 9. The address side and the data side of the memory 9 are connected through resistors to form a self holding circuit.

A $\overline{CE}$ terminal of the memory 9 (which is enabled when a signal of a low level is applied to the terminal) is connected to the power supply of 5 V through the resistor R, so that the signal applied to the terminal is raised to a high level in response to a stop signal. The $\overline{CE}$ terminal is also connected to a collector of a transistor Q1, so that the transistor Q1 is turned on when a start signal is applied to a start input terminal 1a and the level of the $\overline{CE}$ terminal is lowered to a low level. The start terminal 1a is also connected to a collector of a transistor Q2 which has a base connected to a stop terminal 1b, so that, when the transistor Q2 is turned on in response to the stop signal, the transistor Q1 is turned off and the level of $\overline{CE}$ terminal is rendered high.

An $\overline{OE}$ terminal (the output from the memory is enabled when a signal of a low level is applied to the terminal) is connected to a collector of a transistor Q3 in a voltage detecting circuit 15 and also to a resistor R1 which is connected to a power supply. An emitter of the transistor Q3 is connected to ground and a base thereof is connected to one side of a capacitor C, the other side of which is grounded. One end of a zener diode, the other end of which is connected to the power source of 5 V.

An operation of the foregoing now will be described. If and when a voltage of 24 V as shown in FIG. 6(A) is applied to the terminals 6, the power supply of 5 V is raised in line with a time constant curve as shown in FIG. 6(B).

The transistor Q3 continues to be rendered non-conductive since the level of the base thereof is low until the capacitor C in the voltage detecting circuit 15 is completely charged through the zener diode ZD. Accordingly, the $\overline{OE}$ terminal is driven to a high level since the same is pulled up to a high level by a resistor R1 and thus the output circuit of the memory is made inoperative. If and when, as a result of a charging, the power supply of 5 V reaches a predetermined voltage Vcc, the transistor Q3 is rendered conductive by a sufficient base voltage and the voltage level in the $\overline{OE}$ terminal is changed from a high level to a low level. As a result, the output circuit of the memory 9 is made operative and thus no output in an undefined region of the memory is made, which signifies that correct sequence controls are made.

If and when a start signal is entered to the start terminal 1a, the transistor Q1 is rendered conductive and the $\overline{CE}$ terminal is adapted to select the memory at a low level, a sequence output can be outputted. Thereafter, if and when the stop signal is inputted to the stop terminal 1b, the transistor Q2 is rendered conductive, the transistor Q1 is rendered non-conductive and the $\overline{CE}$ terminal is returned to the high level. As a result, the memory 9 is placed in a waiting state until the next start signal comes.

Figure 7:
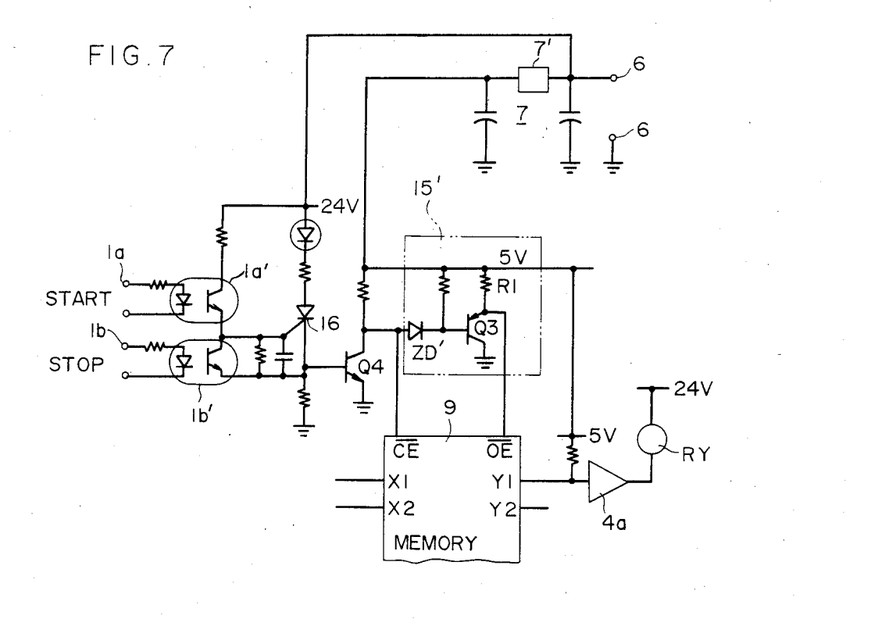
FIG. 7 is a circuit diagram showing another embodiment of the present invention.

FIG. 7 shows another embodiment wherein photocouplers 1a' and 1b' for receiving a start and stop signals are used. A thyrister 16 is made on or off by signals from the photocouplers 1a' and 1b', so that a transistor Q4 makes the $\overline{CE}$ terminal of the memory 9 a low level or high level. A voltage detecting circuit 15' includes a zener diode ZD', the one end of which is connected to the $\overline{CE}$ terminal, and a transistor Q3, the base of which is connected to the zener diode ZD' and a resistor R1 connected to the collector of the transistor Q3 which is also connected to the $\overline{OE}$ terminal which is raised up to a high level by the resistor R1. The emitter of the transistor Q3 is connected to a ground.

Thus, if and when the power supply of 24 V is applied, the photocoupler 1a' has a high resistance because of absence of start input signal in the terminal 1a and the thyrister 16 is not triggered. As a result, the transistor Q4 is rendered non-conductive. Accordingly, the level of the $\overline{CE}$ terminal is raised up to the level of the power supply by the resistor R1 to be a high level and the memory 9 is not enabled. As described in the foregoing, the transistor Q4 is rendered non-conductive when the power supply is applied, the zener diode ZD' is also off, the transistor Q3 is also off and thus the level of the $\overline{OE}$ terminal is made to be high level by way of the resistor R1. Therefore, an output other than predetermined outputs can not be withdrawn at that time, since the output circuit of the memory is not made operative.

If and when a start signal is entered when the power supply of 5 V reaches a predetermined voltage, the transistor Q4 is rendered conductive to turn the zener diode ZD' on. As a result, the transistor Q3 is rendered conductive and the level of the $\overline{OE}$ terminal becomes low to to enable outputting. In the case that the power supply of 5 V does not reach a predetermined voltage, the voltage level of the $\overline{OE}$ terminal never goes low and thus an erroneous output is never withdrawn since the zener diode ZD' is off even if a start input is entered.

As described in the foregoing, in accordance with the present embodiment, a sequence controlling apparatus can be prevented from providing an undefined sequence outputs other than predetermined sequence outputs, since the sequence controlling apparatus is adapted such that the $\overline{OE}$ terminal is rendered high at the time of turning the power supply on, so that an erroneous sequence output is not outputted, and such that the $\overline{OE}$ terminal is rendered to be a low level when a predetermined voltage is reached and detected by a voltage detecting circuit, so that the output circuit of the memory is set to an operating state.

If relays capable of being driven by, for example, 5 V is used as output relays RY, the three-terminal regulator 7' is not necessarily required. More particularly, in such a case, the voltage of 24 V is not necessary, since a power supply of 5 V applied to the terminals 6 is used not only for the input circuit and output circuit, but also a driving voltage of the relay RY.

Figure 8:
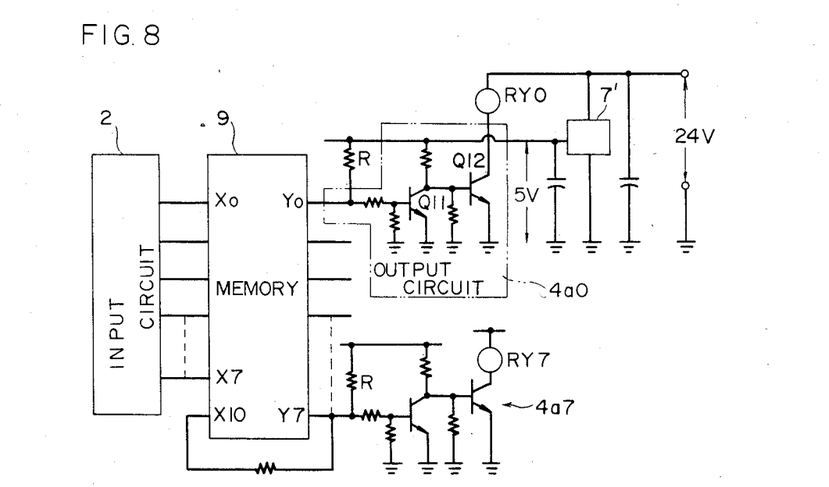
FIG. 8 is a circuit diagram showing other embodiment of the present invention.

FIG. 8 is a circuit diagram showing an embodiment of the present invention. The memory 9 may be an erasable programmable read only memory in which data can be written and erased, and the memory 9 is also provided with terminals X0 . . . X7 in the address side and terminals Y0 ... Y7 in the data side wherein a self holding circuit is formed between the terminal Y7 and the terminal X10.

The terminals Y0 ... Y7 are connected to the power supply (5 V in FIG. 8) through the resistor R. In addition, the terminals Y0 ... Y7 are connected to output circuits 4a0, ... 4a7.

The output circuit 4a0 comprises a non-inverting circuit of transistors Q11 and Q12. The transistor Q12 is connected to the power supply (24 V in FIG. 8) through an output relay RY0.

A power circuit includes a three-terminal regulator 7' and is adapted such that 5 V is derived from the 24 V input.

The memory 9 is set so that a high level voltage is caused at the terminal Y0 when the data output is 0 or is absent.

Therefore, if and when the data is written into the memory 9, the voltage level of the terminal Y0 is low, the transistor Q11 is rendered non-conductive and the transistor Q12 is rendered conductive and thus the outputs relay RY0 is made operative. If and when data is not written into the memory 9, the voltage level of the terminal Y0 is high, the transistor Q11 is rendered conductive, the transistor Q12 is rendered non-conductive and thus the output relay RY0 is made inoperative, thus providing no outputs.

In addition, even if the memory is not inserted, the base of the transistor Q11 is pulled to a high level by the resistor R to render the transistor Q11 conductive and the transistor Q12 non-conductive and thus the output relay RY0 is turned off, which means that no output is produced. Therefore, in this kind of sequence controller wherein the memory 9 can be inserted and removed by a socket, thus preventing undesired erroneous output.

As described in the foregoing, in accordance with the present embodiment, since the terminals of the data output side are set to a low level in the presence of a data output so that the output relay is driven through a non-inverting circuit, erroneous output is prevented even when no data is written into the memory or the memory is not inserted. Thus, a load operated by sequence operations can not be interrupted, and accordingly, a reliability of a sequence controlling apparatus is increased.

Figure 9:
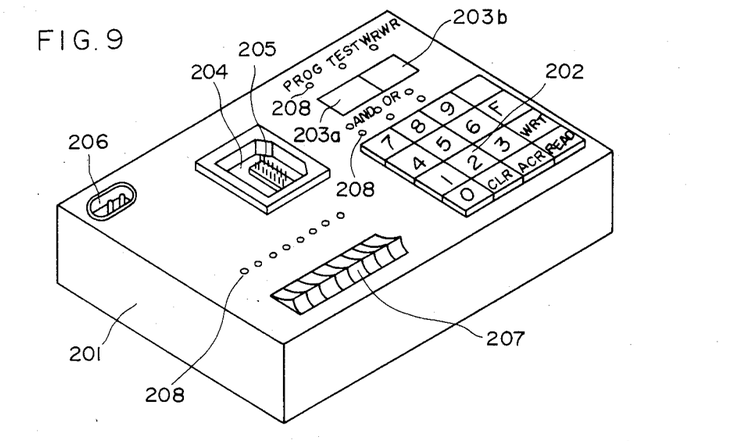
FIG. 9 is a perspective view showing an example of a writing apparatus for writing a program into an erasable programmable read only memory for use in the embodiment of the present invention.

FIG. 9 shows a perspective view of an external appearance of an example of a data writing apparatus of a programmable read only memory, wherein the data writing apparatus includes a case for housing an arithmetic portion and a sequence checking portion (described subsequently) and entrance keys 202 for entering symbolic code. Of entrance keys 202, "F" key is a function key (shift key) for entering symbolic codes such as "X", "Y", "OR", "NOT", "STRT" and the like, using numeric entrance keys "0", . . . "9". The data writing apparatus further comprises a character display for key entrance indication or a simulated result indication, a memory unit inserting portion 204, a male connector 205 for connecting a memory unit, a socket for power supply 206 and a sequence checking switches 207 for checking whether the sequence data computed by the arithmetic portion is erroneous or not. Each of the sequence checking switches 207 for simulating the sequence control states corresponds to the respective input switch X0, X1, X7 ... . A light-emitting diode 208 for indicating operation of a corresponding switch X0–X7 is also provided. The memory unit 10 (FIG. 1) is inserted to the memory unit inserting portion 204 such that the female connector 3' is connected to the male connector 205, and the sequence data outputted from the arithmetic portion is written into the programmable read only memory 9 (FIGS. 3 and 4).

Figure 10:
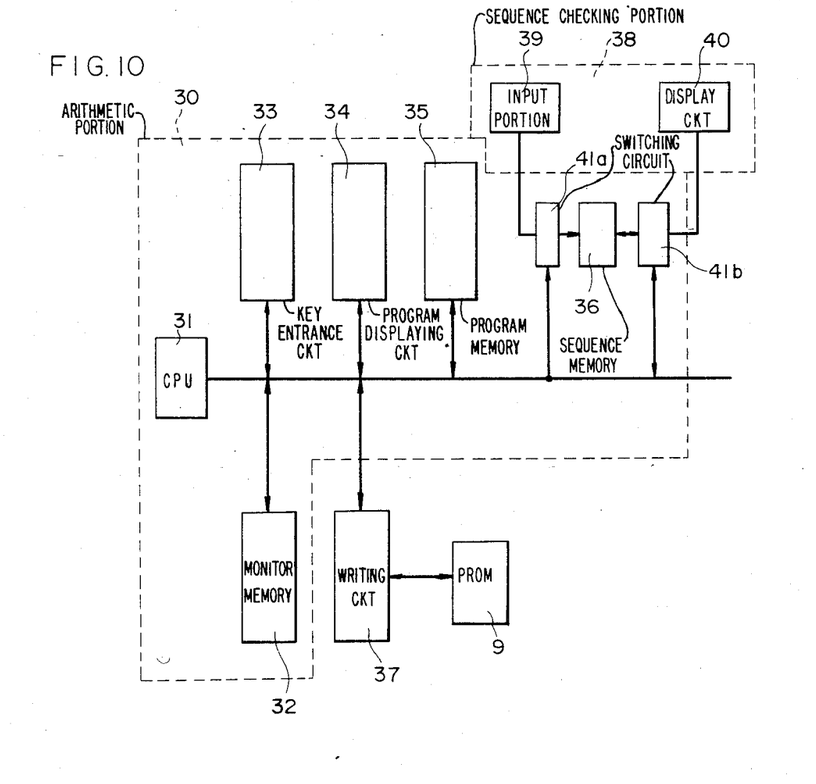
FIG. 10 is a block diagram showing the FIG. 9 embodiment.

FIG. 10 is a block diagram showing the circuit structure. The arithmetic portion 30 comprises a central processing unit 31 including a microcomputer, a monitor memory 32 for driving the central processing unit, a key entrance circuit 33, a program displaying circuit 34 for displaying a program according to symbolic codes entered by key entrance, a program memory 35 for storing said program, a sequence memory 36 for storing the result of the operation, that is, the sequence data which is caused by simulating the sequence controlling circuit in the central processing unit 31 based on the program in the program memory 36. A writing circuit 37 writes into the programmable read only memory 9 the sequence data stored in the sequence memory 36. A sequence checking portion 38 comprises an input portion 39 for entering simulate data inputted by the sequence checking switches 27 and a display circuit 40 for displaying the simulated result, wherein it is checked whether the sequence data stored in the sequence memory 36 is erroneous or not. Switching circuits 41a and 41b are also provided.

Figure 11:
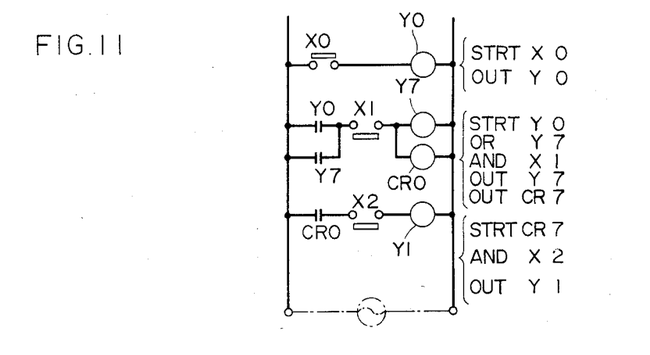
FIG. 11 is an equivalent circuit of a sequence controlling circuit for explaining an operation of the embodiment.

The corresponding relation between the symbolic codes and the constituent parts of the sequence controlling circuit and the connection thereof will be described in the following. For example, the symbolic codes (X0) and (X1) correspond to the input switches X0 and X1, the symbolic codes (Y0) and (Y1) correspond to the output relays Y0 and Y1, the symbolic code (CR0) corresponds to an inner relay CR0, the symbol code (STRT) corresponds to a code indicating an input for classifying the sequence control circuit, the symbolic code (AND) corresponds to a code indicating that the constituent parts are connected in series, the symbolic code (OR) corresponds to a code indicating that the constituent parts are connected in parallel, and the symbolic code (OUT) is a code indicating an output. Each relay and its associated relay contact are represented by the same symbolic code. The equivalent circuit as shown in FIG. 11 may be entered to the arithmetic portion 30 using symbol codes. The sequence of inputting symbolic codes is shown in the right side in FIG. 11.

The connecting relation of the constituent parts in the equivalent circuit (FIG. 11) of the sequence control circuit is entered, as predetermined symbolic codes (STRT), (X0) . . . , (Y0) . . . and (AND), into the arithmetic portion 30 through input keys 207, and the sequence control circuit is simulated by substituting a logic circuit for the connecting relation of the constituent parts in the arithmetic portion 30 to make a logical operation. At that time, the arithmetic portion 30 is adapted such that all the possible states of the input switches X0, X1 . . . at the time of sequence controlling are withdrawn as simulated inputs and sequence data in each state is sequentially withdrawn as a simulated output. The simulated output is written into the sequence memory 36 by receiving the simulated inputs as address data. The simulated output, that is, the sequence data written into the sequence memory 36 is checked in a sequence checking portion 38 to see whether an error is caused or not. If and when there is no error in the sequence data, the content of the sequence memory 36 is written into the programmable read only memory 9 through the writing circuit 37.

Figure 12:
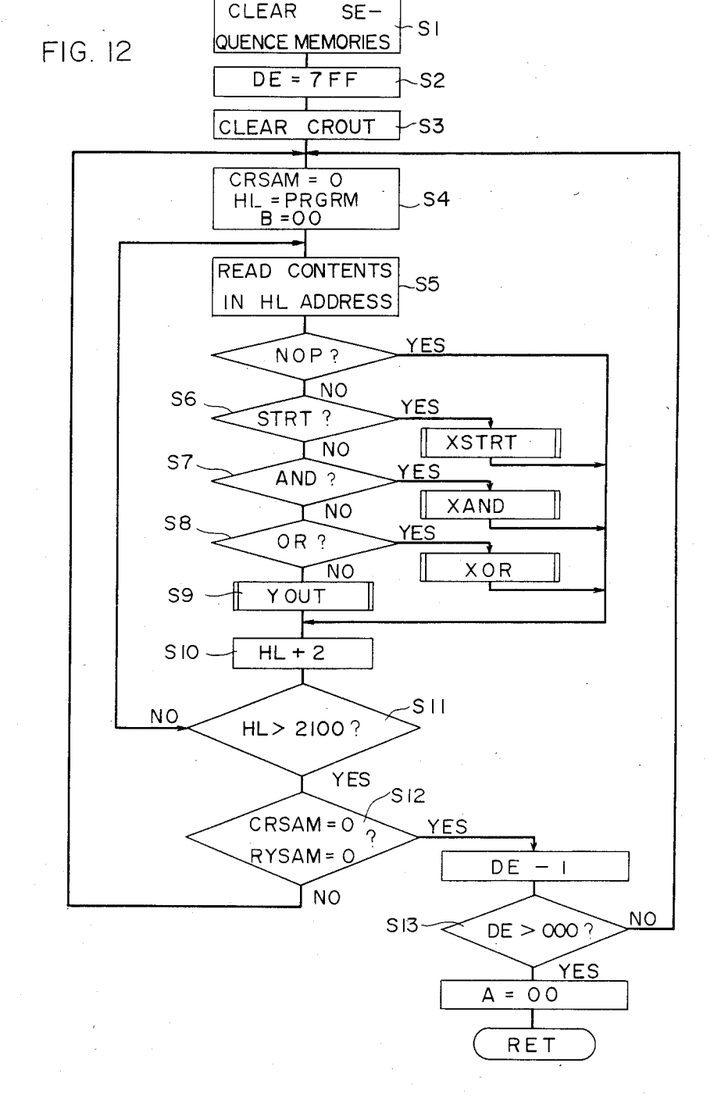
FIGS. 12 to 16 are flow diagrams for explaining an operation of the embodiment.

FIG. 12 is a main flow chart showing an arithmetic operation in the arithmetic portion 30. The operation of the arithmetic portion 30 will be described in the following.

Figure 13:
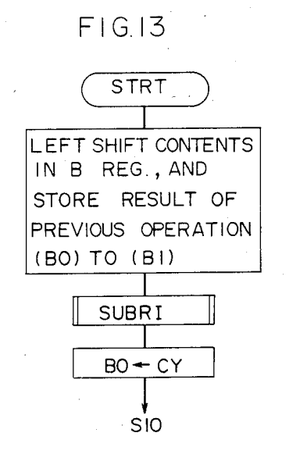
Figure 14:
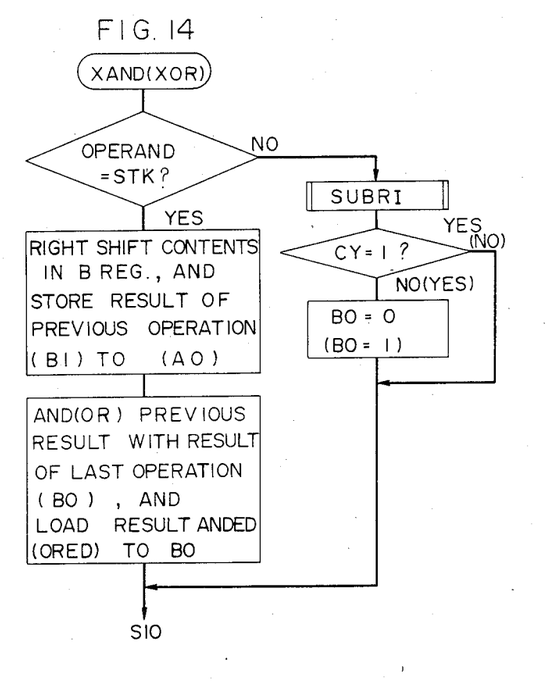
Figure 15:
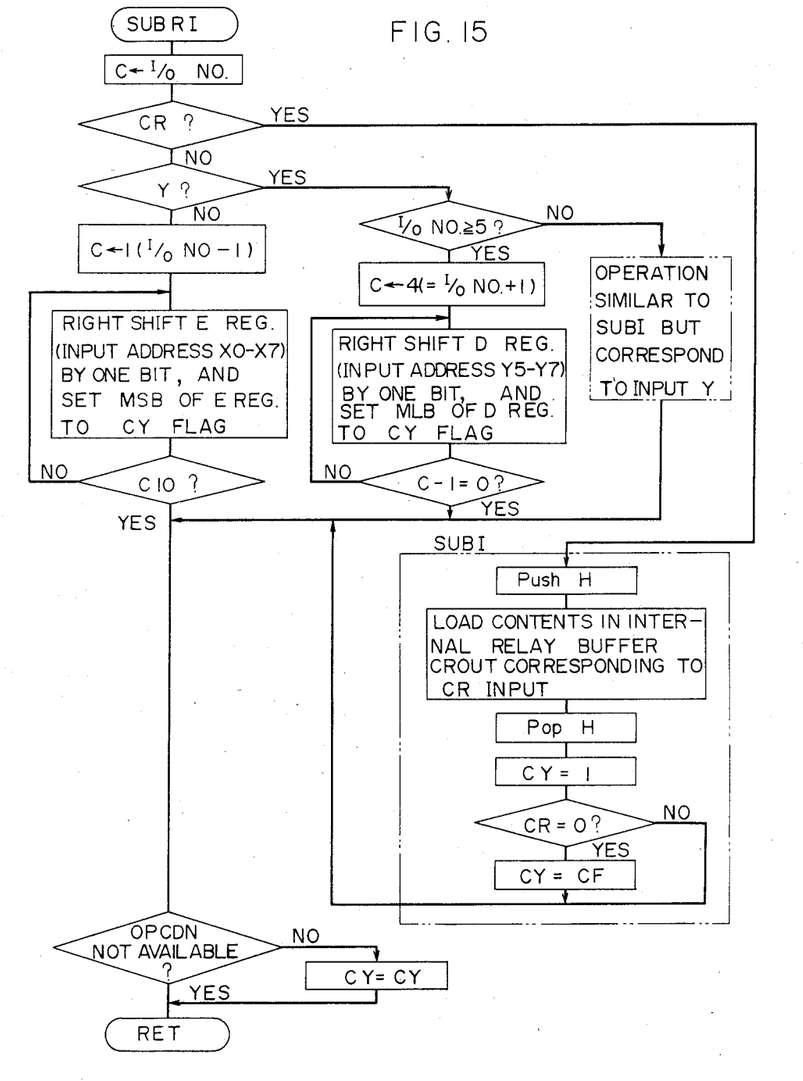
Figure 16:
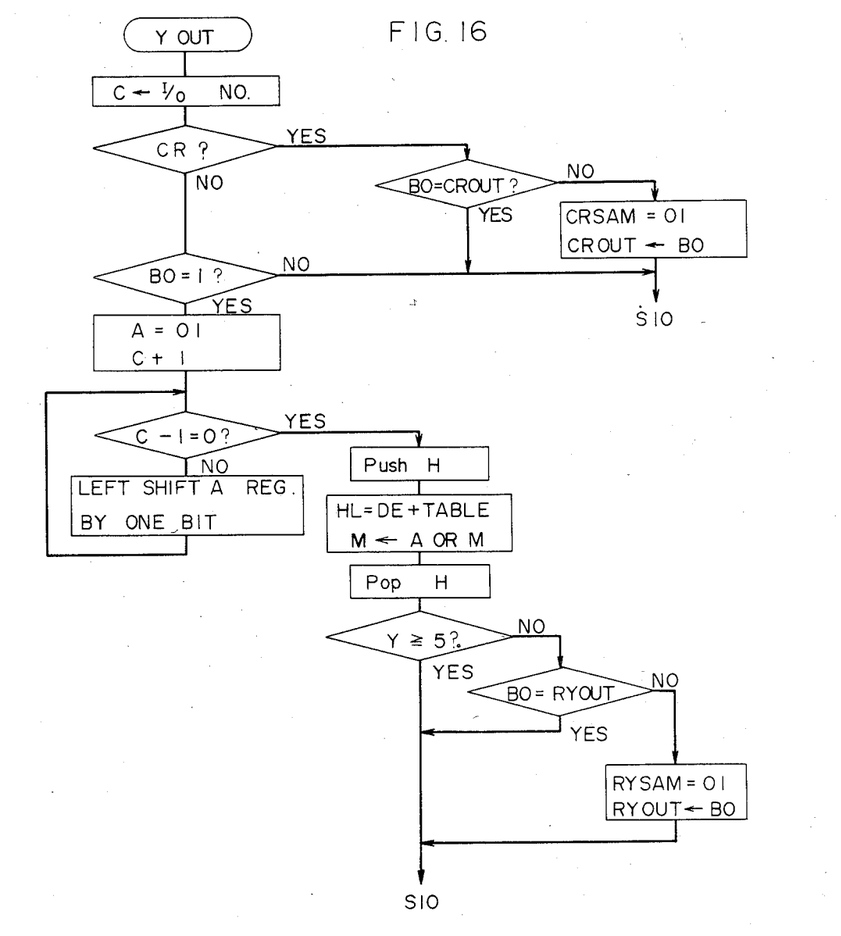

In the step S1, the sequence memory 36 is completely cleared. In the step S2, the address capacity DE (the number of the sequence control states) of the sequence memory 36 is set. In the step S3, buffers CROUT in the inner relays CR0 . . . , and the output relays Y0, Y1 . . . are cleared. In the step S4, the address HL necessary for reading a sequence program from the program memory 35 is set in the first address in which the sequence program is stored, and the B register for storing the result of the operation is cleared and the buffer CRSAM for storing the states of the inner relays CR0 . . . is also cleared. In the step S5, the contents of the sequence program in the HL address is read out. In the step S6, it is determined whether the sequence program is a start instruction (STRT) or not and if it is a start instruction, a logical operation is made in the STRT operation routine in accordance with a flow chart as shown in FIG. 13. In the step S7, it is determined whether the sequence program is an AND instruction (AND) or not and if it is an AND instruction, a logical operation is made in the AND operation routine in accordance with a flow chart as shown in FIG. 14. FIG. 15 is a flow chart of a subroutine SUBRI. In the step S8, it is determined whether the sequence program is an OR instruction (OR) or not and if it is an OR instruction, a logical operation is made in the OR operation routine in accordance with a flow chart as shown in FIG. 14. In the step S9, if the sequence program is an OUT instruction, a logical operation is made in the OUT operation routine in accordance with a flow chart as shown in FIG. 16. In the step S10, +2 is added to the HL address in which the sequence program is read out. An instruction (a symbolic code) indicating the connecting relationship is entered in the first address and the input or output number (a symbolic code) is entered in the next address. In the step S11, if the HL address in which the sequence program is read out is not the last address, the program jumps to the step S5 for the purpose of reading out of the contents in the sequence program. In the step S12, the program jumps to a step S4 in case that CRSAM or RYSAM is changed. In the step S13, in case that CRSAM or RYSAM is not changed (CRSAM=0, RYSAM=0), DE is decreased by 1 and the program proceeds to the next step. At that time, the program jumps to the step S4 in case that the address capacity DE of the sequence memory 36 is not 0.

Meanwhile, in the flow chart, A register is an accumulator, B register is a register for entering the result of the operation (CY), C register is a register for entering input/output number, D register is a register for entering the Y simulate input (the states of the output relays Y0, Y1 . . . ), E register is a register for entering the X simulate inputs (the states of input switches X0, X1 . . . ), TABLE is the first address in the sequence memory 36, PRGRM is the first address in the program memory, and LSTPJ and LSTPK are the last address in the program memory 35, respectively.

In accordance with the above described structure of the present embodiment, if and when the connecting relation of the constituent parts in the equivalent circuit of the sequence control circuit is key-entered into an arithmetic portion in a manner of predetermined symbolic codes, all the possible states of the input switches at the time of sequence control and the sequence data in each state are sequentially and automatically withdrawn to simulate inputs and simulate outputs, respectively, by substituting a logic circuit for the connecting relation of the constituent parts in the arithmetic portion and making a logical operation. As a result, conventional troublesome operation is avoided when sequence data is made taking into consideration the operation of each constituent part. In addition to this, since the simulate output is read into the programmable read only memory by using the simulated inputs as address data, the writing operation of the sequence data into the programmable read only memory is advantageously simplified.

Although the present invention has been described and illustrated in detail, it is clearly understood that the same is by way of illustration and example only and is not to be taken by way of limitation, and this the spirit and scope of the present invention being limited only by the terms of the appended claims.

What is claimed is:

1. A sequence controlling apparatus including a control unit and a memory unit detachably mounted to the control unit,
   said control unit comprising:
   a body having a recess surrounded by a surrounding wall formed integrally with said body;
   a plurality of input terminals for receiving a plurality of input signals,
   an input circuit connected to said input terminals,
   an output circuit,
   a plurality of output terminals connected to said output circuit to supply said output signals, and
   a first connector connected to said input circuit and said output circuit;
   said memory unit comprising:
   a second connector selectively connected to said first connector to electrically connect said memory unit to said control unit,
   programmable read only memory means disposed in a case and being connected to said input circuit and said output circuit of said control unit via said second connector and said first connector for performing all sequence logical operations in response to said input signals and for providing sequence signals to said output circuit in response thereto, said programmable read only memory having an erasable portion;
   said case having a window positioned in juxtaposition to said erasable portion when said programmable read only memory is housed in said case, and
   said window being positioned such that incoming light is interrupted by said surrounding wall when said first and second connectors are connected to each other, whereby an undesired erasure of said erasable programmable read only memory is prevented.

2. The sequence controlling apparatus of claim 1, wherein said case includes a flange which projects from said surrounding wall when said first connector is connected to said second connector;
   said first connector and said second connector being connected to each other so that said case is surrounded by said surrounding wall, whereby a gap is formed between said flange and said body.

3. The sequence controlling apparatus in accordance with claim 1, wherein said memory means comprises a programmable read only memory.

4. The sequence controlling apparatus of claim 1, wherein said control unit further comprises
power supply terminals connected to a power supply, and
a power circuit connected to said power supply terminals for supplying a power to said input circuit and said output circuit therefrom.

5. The sequence controlling apparatus of claim 4, wherein said memory means includes a memory having a memory enable terminal;
said apparatus further comprising voltage detecting means operably connected to said memory enable terminal for providing an output to said memory enable terminal to enable said memory when a predetermined supply voltage from said power circuit is detected.

6. The sequence controlling apparatus of claim 4, wherein said memory means comprises a read only memory, said input circuit and said output circuit being connected to the address side and data side of said read only memory, respectively, the data output of the read only memory being output from the output circuit, the data side of the read only memory being connected to said power supply by a resistor and an output relay;
said output relay being driven through a non-inverting circuit comprising at least two stages of transistors.

7. The sequence controlling apparatus of claim 1 wherein the contour of said case is formed so as to mate with said recess in said body,
said case being provided with an opening for mounting said second connector,
said second connector and said memory means being housed within said case wherein said opening for mounting corresponds to the location of the said second connector, and
said case being surrounded by said surrounding wall when said first connector is connected to said second connector to form a complete sequence controlling apparatus.

8. The sequence controlling apparatus of claim 1, wherein said body is generally rectangular in shape, formed of an insulating material and having a length direction with a longitudinal axis,
said control unit further comprising an electronic block comprising said input circuit and output circuit contained in said body, said input terminals and said output terminals being provided along both sides of said longitudinal axis of said body in an opposing relationship,
said recess surrounded by said surrounding wall being formed in one end of said body along said longitudinal axis,
said first connector being a male connector disposed in said recess;
said second connector being a female connector.

* * * * *